United States Patent [19]
Kanai et al.

[11] 4,156,712
[45] May 29, 1979

[54] GAS-LIQUID CONTACTING METHOD

[75] Inventors: Toshio Kanai; Hiroshi Yanagioka, both of Yokohama; Hideo Idemura, Tokyo; Hiroshi Sugiyama, Yokohama; Yoshio Kogawa, Fujisawa; Michihiro Yoshida, Komae; Mitsugu Kitamura, Yokohama; Teruo Sugiya, Kawasaki, all of Japan

[73] Assignee: Chiyada Chemical Engineering & Construction Co., Ltd., Yokohama, Japan

[21] Appl. No.: 772,779

[22] Filed: Feb. 28, 1977

[30] Foreign Application Priority Data

Feb. 28, 1976 [JP] Japan .................................. 51-20608
Feb. 28, 1976 [JP] Japan .................................. 51-20609
Nov. 18, 1976 [JP] Japan .................................. 51-137821

[51] Int. Cl.$^2$ ............................................ B01D 53/34
[52] U.S. Cl. .................................... 423/242; 423/210; 423/220; 423/224; 423/232; 423/234; 423/235; 423/240; 423/497; 423/550; 423/555; 261/77; 261/84; 261/93; 261/121 R
[58] Field of Search ................ 423/210, 220, 224, 242, 423/243, 235, 345, 396, 545, 550, 554, 555, 166, 240, 245, 234, 497; 23/273 R; 261/77, 84, 93, 121 R

[56] References Cited

U.S. PATENT DOCUMENTS

| | | | |
|---|---|---|---|
| 1,817,778 | 8/1931 | Sperr, Jr. ........................ | 423/232 X |
| 2,137,729 | 11/1938 | Schellenburg ..................... | 23/273 R |
| 3,836,630 | 9/1974 | Noguchi et al. .................. | 423/555 X |

OTHER PUBLICATIONS

A.P.C. Application of G. Fauser, Ser. No. 306,071, Published Apr. 27, 1943.

*Primary Examiner*—Earl C. Thomas
*Attorney, Agent, or Firm*—Armstrong, Nikaido, Marmelstein, Kubovcik

[57] ABSTRACT

A method for removing sulfur dioxide from flue gases by simultaneous absorption and oxidation in an aqueous absorbent. An enclosed body of an aqueous liquid absorbent for the sulfur dioxide is provided and the flue gas is sparged into an upper portion of the liquid absorbent to form a first zone thereof. An oxygen-containing gas is introduced into a lower portion of the liquid absorbent to form a second zone of the liquid absorbent that is below the first zone of the liquid absorbent and which has an apparent density that is higher than that of the first zone. The oxygen-containing absorbent from the second zone is circulated to the first zone near the point of the flue gas introduction and an alkaline material reactive with the sulfur dioxide in the liquid absorbent is introduced into the body of liquid absorbent thereby fixing the sulfur dioxide in the liquid absorbent in the form of a sulfate. The sulfate is subsequently removed from the body of aqueous liquid absorbent. The method according to the invention can be carried out in a compact apparatus and achieves a high rate of desulfurization.

8 Claims, 8 Drawing Figures

GAS-LIQUID CONTACTING METHOD

BACKGROUND OF THE INVENTION

The present invention relates to a gas-liquid contacting method and apparatus, more particularly to a gas-liquid contacting method and apparatus for contacting a flue gas containing pollutants, such as sulfur dioxide, which is poisonous to men and beasts when discharged to the atmosphere, with an absorbent liquid of said pollutants.

Recently, the so-called wet-type desulfurization method has greated developed, which is adapted for removing sulfur dioxide contained in a flue gas of boilers of power plants, sulfuric acid plants and so on in the wet method, but the basic type of this desulfurization method is such one, except for the waste gas desulfurization method in pulp factories, that $SO_2$ in a waste gas is once fixed as sulfurous acid salt and thereafter is oxidized to sulfuric acid salt thereby fixing it in this form. This method may be roughly classified from the viewpoint of the $SO_2$ absorption agent, namely $SO_2$ fixing agent, into the caustic soda absorption method, the ammonia absorption method, the lime absorption method, the sulfuric acid absorption method and the magnesium oxide absorption method etc., and it has been the present situation that due to the difference of $SO_2$ fixing agent a variety of kinds of by-product compounds, namely sulfuric acid salts are produced, with the result that according to the kind of the $SO_2$ fixing agent, the devices per se become greatly varied and complicated.

Also, in the case that a great capacity of the waste gas, such as, for example, 100 million $Nm^3$/hr.–200 million $Nm^3$/hr. is treated, it is the present status that since a pressure drop necessary for the absorption can not be made large, the absorption apparatus becomes necessarily large.

Particularly, in the case that the contact of a large capacity of gas and liquid and the precipitation of aolids are performed continuously, since respective devices have different functions and constructions, it has been the general manner to adopt such a system that a gas-liquid contacting device and a solid precipitation device are respectively mounted separately and these are connected through pipings by using a pump as driving source.

The inventors et al. of the present invention have studied about concentrating said gas-liquid contacting device and the solid precipitation device and uniting them in one body many-sidely, and found that in the case that only the prior art systems are combined, the devices become complicated and large in size without obtaining advantages of the concentration of the devices and in view of this, such a problem can be solved by adopting a new gas-liquid contacting system which permits the existence of solids.

Namely, it has been found that in the wet-type waste gas desulfurization method, one of the systems for making the device most compact is a method of absorbing sulfur dioxide and performing oxidation by means of oxygen containing gas simultaneously and at the same position.

However, in order to realize this method effectively, it has been a problem how to allow oxygen which is slow in the absorption speed compared with sulfur dioxide to be absorbed in the absorbent liquid to the same extent as sulfur dioxide. Accordingly, the present invention et al. have studied earnestly further about obtaining an industrial method and apparatus which is possible to perform the absorption and oxidation of pollutants such as sulfur dioxide efficiently and at a stroke and as a result the present invention has been attained.

OBJECT OF THE INVENTION

The first object of the present invention is to provide a method and apparatus for removing pollutants from a flue gas.

The second object of the present invention is to provide a method and apparatus to continuously perform a gas-liquid contact in a single tank and which is compact in construction and has a high performance.

A further object of the present invention is to provide a method and apparatus which permits the steps that an oxygen containing gas is introduced in a flue gas absorption zone separately of the flue gas, and sulfur dioxide and oxygen are allowed to be absorbed separately at a large absorption speed in said flue gas absorption zone, which is under the complete mixed condition, thereby causing the reaction in the absorbent liquid, so that the absorption and oxidation are performed simultaneously and in the same position.

BRIEF SUMMARY OF THE INVENTION

The above described objects can be attained by adopting the following method and apparatus, namely, such a method for removing pollutants from a flue gas by contacting the flue gas with an absorbent liquid, which comprises introducing a reactant for pollutants into an absorption liquid, and forming two liquid continuous zones, namely a first zone and a second zone, and connecting these zones through a continuous phase of the absorption liquid, introducing oxygen in said second zone and introducing the flue gas in the first zone where the oxygen containing absorbent liquid is circulated from the second zone, and such a gas-liquid contacting apparatus which is a gas-liquid contacting apparatus containin an absorbent liquid for removing pollutants from a flue gas which comprises;

(a) means for introducing flue gas having an opening portion below the liquid level of the absorbent liquid;

1 (b) means for introducing oxygen containing gas having an opening portion at a location below the opening portion of said flue gas introducing means;

(c) means for discharging the treated gas after the contact with the absorbent liquid located above the liquid level of said absorbent liquid;

(d) means for introducing a reactant below the outlet of said treated gas but above the opening portion of said oxygen containing gas introducing means;

(e) means for introducing absorben liquid below the outlet of said treated gas but above the opening portion of said oxygen containing gas introducing means;

(f) means for discharging products;

(g) means for discharging absorbent liquid; and (h) means for maintaining the level of said absorbent liquid at a constant.

and further another gas-liquid contacting apparatus, which is a gas-liquid contacting apparatus containing an absorbent liquid for removing pollutants from a flue gas which comprises;

(a) a unit consisting of a funnel for introducing gas and liquid and a cup for mixing and separating gas and liquid after passing through said funnel, the lower end of said funnel extending in the interior of said cup and said funnel having means for tangentially introducing absorbent liquid at its upper portion;
(b) means for introducing the flue gas and means for introducing absorbent liquid each located above said unit;
(c) means for introducing oxygen containing gas below the level of absorbent liquid contained below said unit;
(d) means for discharging the treated gas after the contact with an absorbent liquid located above the level of said absorbent liquid;
(e) means for introducing a reactant above the opening portion of said oxygen containing gas;
(f) means for discharging products;
(g) means for discharging absorbent liquid;
(h) means for maintaining the level of said absorbent liquid at a constant.

BRIEF DESCRIPTION OF THE DRAWINGS

FIGS. 6(A), (B) and (C) show the relationship between the rate of desulfurization and apparent density and between the depth of the aqueous absorbent and apparent density for the method according to the present invention described in Example 9.

DETAILED DESCRIPTION OF THE EMBODIMENTS

A method and apparatus of the present invention will be explained by way of examples with reference to the accompanying drawings wherein a most typical embodiment of an apparatus of the present invention will be first explained with reference to FIGS. 1 through 3 and a way of carrying out a method of the present invention by using such an apparatus will be explained, and thereafter other embodiments of the apparatus of the present invention will be explained with reference to FIGS. 4 and 5.

A most typical apparatus of the present invention is a gas-liquid contacting apparatus 2 containing an absorbent liquid 1 for removing pollutants from a flue gas which comprises;
(a) means 5 for introducing flue gas having an opening portion 10 below the liquid level of the absorbent liquid 1;
(b) means 4 for introducing oxygen containing gas having an opening portion at a location below the opening portion 10 of said flue gas introducing means 5;
(c) means 6 for discharging the treated gas after the contact with the absorbent liquid 1 located above the liquid level of said absorbent liquid 1;
(d) means 3 for introducing a reactant and an absorbent liquid below the outlet of said treated gas but above the opening portion of said oxygen containing gas introducing means 4;
(e) means 7 for discharging an absorbent liquid and products.

Furthermore, this gas-liquid contacting apparatus preferably has an agitator 8 and means 9 for partially circulating the absorbent liquid 1 between said two zones A and B in said apparatus in the interior thereof. Said means 9 may be a dynamic means for directly circulating the absorption liquid or a static means for assisting the circulation.

Figures 1, 2:
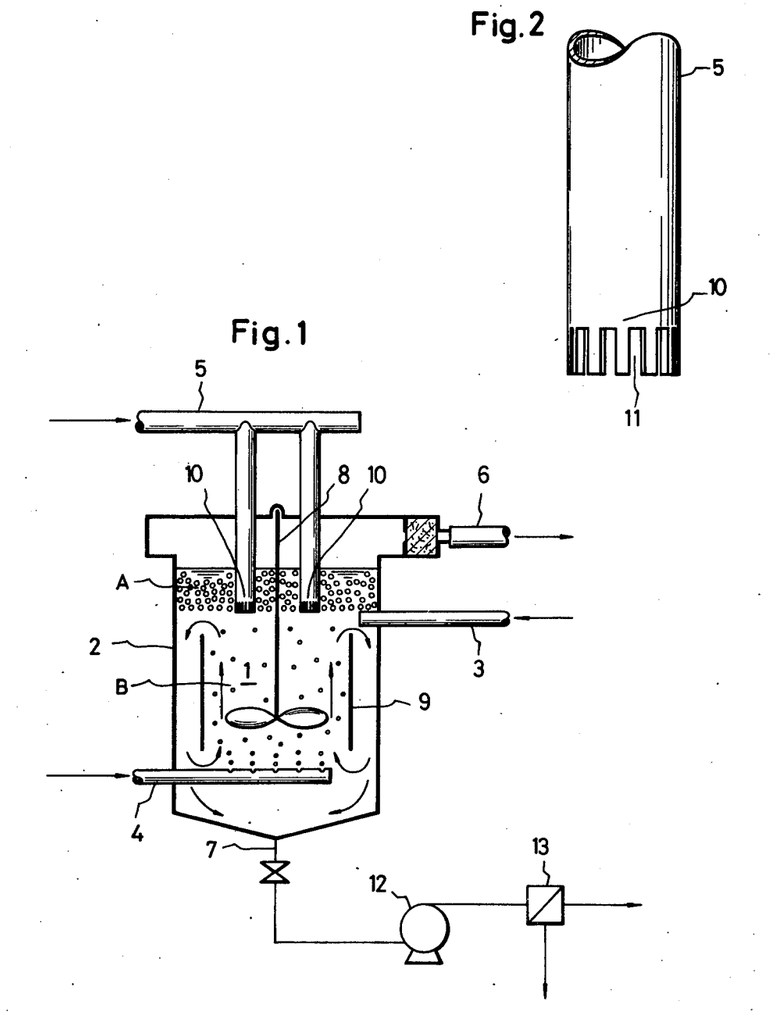
FIG. 1 illustrates apparatus for carrying out the method according to the present invention.
FIG. 2 shows an enlarged view of the flue gas introducing means of FIG. 1.

Also, at the opening portion 10 of the introducing means 5 for flue gas, notches 11 are formed so as to allow the flue gas to be dispersed in the absorbent liquid as shown in FIG. 2. Of course, the opening portion 10 may be constructed in other constructions such as triangular slit type, perforated type and the like which permit introducing of the gas into the liquid particularly preferably in a dispersed condition.

Furthermore, the first zone A is constructed such that in addition to a mere bubbling system only by gas blowing from a pipe submerged in the liquid as shown in FIG. 1, it is constructed in such a system that in order to promote the gas-liquid contact sufficiently an appropriate structure such as one or more mesh plates, lattices or perforated plates having an appropriate hole ratio is mounted and further in order that the liquid haing absorbed sulfur dioxide is rapidly oxidized and regenerated and performance of desulfurization is more elevated, a baffle plate for effecting smooth circulation of the scattered liquid produced at the gas blowing-out portion such as vertical cylinder type member, vertical plate or vertical mesh plate etc. is provided. For the gas treatment particularly of a large capacity, such a mechanism is used effectively that a plurality of these baffle plates are mounted in the lateral direction and near the liquid surface layer portion the gas-liquid contact portions and the liquid sinking portions are arranged alternately.

Also, as means for partially circulating the absorbent liquid between the two zones, a method using an agitator, a method using air agitation, a method using pump agitation, and a method by blowing flue gas with the provision of a downcomer etc. are preferable.

In introducing the oxygen containing gas, as the shape of its blowing-out portion a fixed-type gas dispersion structure of the type such as perforated type, ring type and nozzle type etc. may be used and also a so-called rotating-type gas dispersion mechanism may also be used as desired, which produces minute bubbles while effecting gas dispersion.

As shown in the above embodiments, there is the diversity in construction of the individual parts, and in addition thereto, the shape of the whole apparatus may be any one irrespective of round or angular shape if it can hold the content therein.

However, in the apparatus of such a construction as above described the most important matter is a relative relation of the position where oxygen containing gas is introduced in and the position where flue gas is introduced in. These two positions exist in the two zones respectively, which are provided by separating the absorbent liquid 1 functionally. The one zone B is, with respect to the gas, a zone where only the oxygen containing gas is introduced in and the flue gas is not introduced in. The other zone A is another zone where the flue gas is introduced in. In the present invention, the former is referred to as the second zone and the latter as the first zone. The first and second zones are both composed of the absorbent liquid, and the both are connected through a continuous phase of the same absorbent liquid, but there may be a case where there is no distinct boundary therebetween. Accordingly, these zones can be divided conceptually through the continuous phase of the absorbent liquid, but these are different in their physical properties. Namely, the former includes only oxygen containing gas in bubble condition, but the latter contains bubbles of the flue gas besides the oxygen containing gas, and these are distinctly different in density of the absorbent liquid inclusive of the bubbles, namely in apparent density thereof. The apparent density of the second zone is 0.9–1.0 at the normal temperature, and that of the first zone is 0.2–0.7 at the normal temperature. Accordingly, the difference therebetween is 0.2–0.8. In the present invention, the apparent density changes according to introducing amount of the flue gas and oxygen containing gas and an extent of coexistence of both gases, namely introducing-in positions of the gases, but in the present invention said values are determined in consideration of both said facts.

The reason that said two zones are provided in a single tank and both zones are connected by the absorbent liquid lies in the following.

In order to remove sulfur dioxide from the flue gas by the wet-type absorption method it is necessary to have in the absorbent liquid two processes, namely a process to perform the absorption or the fixing of sulfur dioxide and a process to oxidizing the absorbed sulfur dioxide or a compound produced by the fixing of sulfur dioxide, and the present invention achieves these two processes in a single tank and in this sense requires to provide the two zone in a single tank.

In this respect, it may be also considered to allow these two processes to achieve in a single tank in a complete mixture phase without forming two zones, but the absorption speed of oxygen gas is very slower than that of sulfur dioxide, so that it can not be realized by the method of introducing the flue gas and the oxygen containing gas into the same zone to effect each of said absorptions sufficiently. Accordingly, in the present invention a position where oxygen containing gas is introduced in the absorbent liquid is considerably separated from a position where the flue gas is introduced therein and a part of the absorbent liquid having oxygen gas introduced therein, namely a part of the absorbent liquid in the second zone is fed in the first zone.

Next, it will be explained how to realize a method of the present invention by means of said apparatus, with respect to an apparatus shown in FIGS. 1 and 3. In order to make understanding of the present invention easy, it will be explained about a case where as the flue gas a flue gas containing sulfur dioxide is used and as the reactant a calcium compound is used. Accordingly, the obtained product is gypsum.

A flue gas containing sulfur dioxide is introduced in under the liquid level of a sulfuric acid aqueous solution with gypsum suspended therein in a apparatus 2 through a blowing pipe 5 thereby allowing sulfur dioxide to be absorbed in the first zone A forming a gas-liquid contacting layer having a continuous liquid phase and simultaneously oxidized into sulfuric acid by oxygen derived from the second zone B where air is introduced in dispersion through an oxygen containing gas supply pipe 4 mounted in the position lower than the opening portion 10 of a flue gas blowing pipe 5 in said sulfuric acid aqueous solution having gypsum suspension. In this process, the neutralization reaction also proceeds at the same time and thereby gypsum is produced by calcium compound introduced in a sufficient amount to maintain a concentration of sulfuric acid of 0.01–1% by weight through a reactant supply pipe 3 between the second zone B and the first zone A. The gas from which sulfur dioxide has been removed is subjected to a gas-liquid separation in the space above the liquid level of the apparatus 2 and discharged through a gas discharge pipe 6. The produced gypsum slurry is drawn into a centrifugal separator 13 through a liquid discharge pipe 7 by means of a pump 12 so that the concentration of gypsum in the tank is maintained at 3–40% by weight suitable for the growth of crystal thereby causing the growth of large crystals of gypsum. Then the gypsum which has been dehydrated in centrifugal separator 13 is separately removed. In the apparatus illustrated in FIG. 3, the fresh reactant is fed to a reactant-addition tub 17 through pipe 3' and is mixed with the mother liquor separated from the gypsum slurry in the centrifugal separator 13. The resultant mixture is then circulated and fed to tank 2 by means of pump 14. The concentration of the sulfuric acid aqueous solution suitable for said process of the method is 0.01–1% by weight, but if it is below 0.01% by weight, unreacted calcium compound is produced resulting in lowering of the rate of utilization of calcium compound and production of scaling, and on the contrary if it is above 1% by weight, the maintenance of a high rate of desulfurization is difficult. Furthermore, within said range of the concentration, in the case of a higher concentration, for example, of 1% of weight, it becomes effective to add $Fe^{3+}$ as an oxidation caftalyst. Also, corresponding to the source of flue gas or due to the pretreatment attendant thereto the sulfuric acid aqueous solution may inc,lude ammonium sulfate, sulfate of soda, $FeSO_4$, $Fe_2(SO_4)_3$, $CaCl_2$, $HNO_3$, $HNO_2$, $Al_2(SO_4)_3$ and $MgSO_4$ etc.

Also, in carrying out the method of the present invention, the concentration of gypsum in the tank is held at 3–40% by weight, and this is necessary to obtain coarse crystals of gypsum, and if the gypsum concentration is below 3% by weight, the grain size of the gypsum crystals becomes small and the scale of gypsum becomes easy to produce, and if the gypsum concentration is above 40% by weight, the tank and pipings, etc. are easy to cause clogging and become difficult to operate the apparatus and the effect of gypsum crystal to grain size thereof becomes almost removed, so that it should be avoided to operate above 40% by weight.

Accordingly, in the flue gas desulfurizing method in which sulfur dioxide is fixed as gypsum, it is desirable to adopt such a means that comprises introducing the flue gas in dispersion manner into the liquid of the sulfuric acid aqueous solution having gypsum suspended therein thereby forming the first zone A of gas-liquid contact layer of continuous liquid phase comprising the minute bubbles of the flue gas and said sulfuric acid aqueous solution, introducing an oxygen containing gas into the sulfuric acid aqueous solution having gypsum suspended therein thereby forming the second zone B which comprises the minute bubbles of the oxygen containing gas and said sulfuric acid aqueous solution an is in continuation with the first zone A through the liquid phase and has a smaller amount of the bubbles than that in the first zone A, introducing calcium compound of a sufficient amount to maintain the sulfuric acid concentration at 0.01–1% by weight, and taking out the suspension containing gypsum from said second zone B in a sufficient amount to maintain the slurry concentration at 3–40% by weight.

According to the present invention, the chemical reaction for desulfurization of flue gas is not effected stepwise, but at a time by the following formula and in the same apparatus;

$$SO_2 + CaCO_3 + \tfrac{1}{2}O_2 + 2H_2O \rightarrow CaSO_4 \cdot 2H_2O \downarrow + CO_2 \uparrow$$

Accordingly, the present invention does not mainly depend in such a reaction that sulfur dioxide is once converted to calcium sulfite and then it is oxidized to gypsum. In the method which goes through calcium sulfite there is a large amount of sulfur dioxide in the system so that the absorption efficiency of sulfur dioxide does not rise above a certain limit, but according to the present invention, such reaction does not occut, so that the absorption efficiency of sulfur dioxide increases.

The basic and concrete explanation about the method and apparatus of the present invention is as described above.

Hereinafter, embodiments of the method and apparatus of the present invention will be explained.

At first, the flue gas which is the object of the present invention is a gas including pollutants such as $SO_2$, $H_2S$ and the like, and except these it includes impurities such as $NO_x$, HCl, $NH_3$, hydrocarbon gas, organic acid, phenol, molybdenum, vanadium, nickel and so on, and said gas may be such one that is directly discharged from a combustion apparatus or a reaction apparatus, or that is discharged further after the flue gas treatment of Claus method etc. Also, as reactants for pollutants, $CaCO_3$, $Ca(OH)_2$, NaOH, $NH_3$, $NH_4OH$, $Mg(OH)_2$ and $Na_2SO_3$ are used, but particularly desirable reactants are $Ca(OH)_2$, $CaCO_3$, NaOH and $NH_3$. Accordingly, the effect of the present invention is most attained in the case that $CaCO_3$ and $Ca(OH)_2$ are used in combination as the reactant to $SO_2$ gas. In the present invention the reactant means a reagent which causes reaction with said pollutants thereby producing other compounds.

On the other hand, an oxygen which is intended to be absorbed in the absorbent liquid, oxygen gas or air is selected. Particularly in the case of air, it is blown in the lower portion of the apparatus in the bubble form, and as the case may be, it is used as a power source forming the circulation flow path of the absorbent liquid, for example, together with an agitator or instead of the agitator. Accordingly, in this case a fairly large amount of air is blown in the apparatus.

Next, the absorbent liquid is defined as an aqueous solution containing the reactant. Also in the case of the absorbent liquid containing $CaCO_3$ as the reactant for $SO_2$, it is preferable to have a sulfuric acid concentration of 0.014 1.0% by weight. In order to promote the reaction, catalysts, for example, such as Fe, Mn, Al, Cu, Co and Ni etc. may be allowed to coexist therein.

The temperature is 30°–95° C., particularly preferably 40°–70° C. The pressure is within a range from atmospheric pressure to about 2 kg/cm²G.

Next, other embodiments of the apparatus of the present invention will be described with reference to FIGS. 4 and 5.

Figure 4:
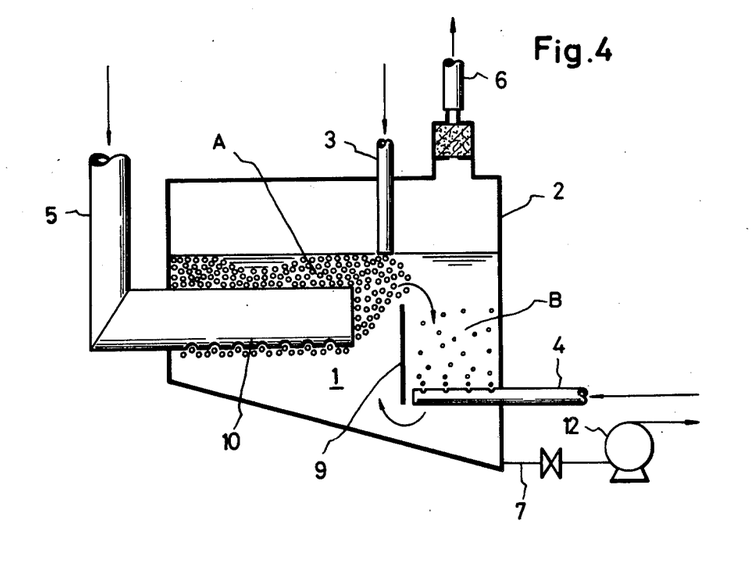

An apparatus shown in FIG. 4 is a most simplified one of the present invention, which comprises tank 2 for containing the absorbent liquid 1, an air introducing pipe 4 for blowing-in of oxygen gas, a flue gas introducing pipe 5 having the opening portion 10, an introducing pipe 3 for reactant and absorbent liquid, a discharge pipe 6 for gas after the contact and a liquid discharge pipe 7 for products, wherein a baffle plate 9 cooperates with the wall of the tank 2 thereby forming the circulation flowing path of the absorbent liquid. In the liquid portion located above the opening portion 10 of the pipe 5, there is formed a layer A which comprises an upper portion of the aqueous absorbent and is rich with froth or bubbles, and in the liquid portion closely above the air introducing pipe 4, a layer B is formed, which comprises a lower portion of the aqueous absorbent and is then or lean with bubbles. The layer B is located to the lower right of layer A. The liquid discharge pipe 7 is connected to pump 12.

Figure 5:
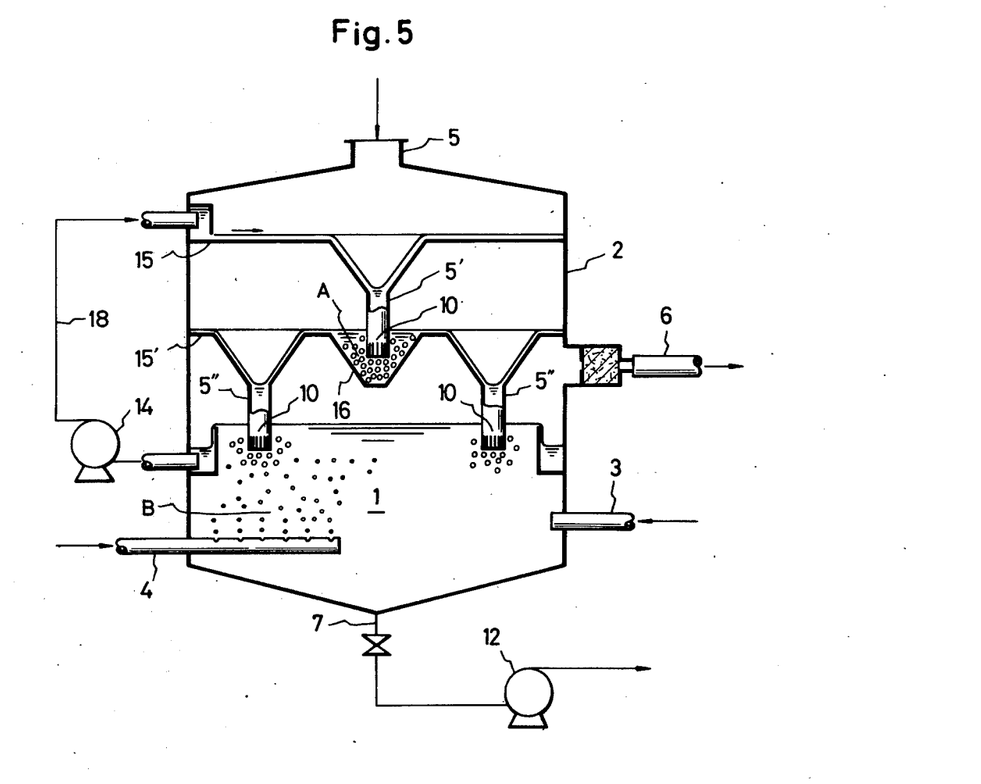

A further apparatus shown in FIG. 5 comprises tank 2 for containing the absorbent liquid 1, a circulation line having a pump 14 mounted for outside circulating a part of the absorbent liquid outside the tank 2, an introducing pipe 4 for oxygen containing gas, a blowing pipe 5 for flue gas having the opening portion 10, an introducing pipe 3 for introducing the reactant, a discharge pipe 6 for gas after the contact and a liquid discharge pipe 7 connected to a pump 12 for the products, and this apparatus is different from the other apparatuses already explained above in such points that the first zone A and second zone B of the absorbent liquid are connected through the circulation system 18 one-sidedly, and the flue gas and absorbent liquid are flowed concurrently while the gas-liquid contact is performed in the first zone A. Namely, the absorbent liquid 1 is pumped up from the circulation system 18 by means of a pump 14 and flowed onto the shelf step 15 at the upper portion of the tank 2 and passes through the opening portion 10 of a gas introducing pipe 5' of funnel and drops in a cup 16 mounted thereunder. However the absorbent liquid rises and flows on the second shelf step 15' formed integrally with the upper surface of the cup 16 and again passes through the opening portion 10 of another funnel-shaped gas introducing pipe 5" and drops under the tank 2. Accordingly the absorbent liquid and gas are contacted each other concurrently at the gas introducing pipes 5' and 5". The gas after the contact is discharged through a gas discharge pipe 6 mounted below the shelf step 15'.

EFFECTS OF THE INVENTION

The present invention is a method and apparatus which is different from the prior art method and apparatus and in which the first zone where the gas-liquid contact of continuous liquid phase is performed and the second zone where an oxygen containing gas is introduced are particularly connected without interposition of a space, namely through a continuous phase of absorbent liquid. In addition, in this case the volume of the gas-liquid contact of continuous liquid phase is small and the gas-liquid contact area can be freely adjusted by changing the height of the liquid level. Also, in the present invention, if a calcium compound is introduced, for example, in the boundary of said first zone and said second zone, the calcium compound is automatically effectively used for the sulfur dioxide in the first zone as well as the neutralization of the produced sulfuric acid thereby yielding notable effect to the desulfurization, and due to the integration of the steps, the integration of an absorption tower, an oxidation tower, a neutralization tank and a crystallization tank is possible and thereby the apparatus can be made in a small size, and it is also possible to make an amount of the circulating absorbent liquid zero. However, the introducing position of the calcium compound may be located in the first zone or the second zone, but preferably in the first zone or at the boundary of both zones. Also, with respect to the rate of desulfurization, the first zone and the second zone are contacted through a continuous phase of liquid without interposition of a space, and a calcium compound is introduced therein, and thereby the absorption, oxidation and neutralization of sulfur dioxide proceeds simultaneously, and in spite of the sulfuric acid aqueous solution having a small solubility for sulfur dioxide, a high rate of desulfurization can be realized. Also, as described above, by displacing the liquid level up and down the gas-liquid contacting area can be changed freely so that the rate of desulfurization can be easily adjusted.

In the gas-liquid contacting layer (the first zone) of the continuous liquid phase according to the present invention, the mass transfer can be efficiently performed by the turbulent disturbance caused when the high speed gas strikes against the liquid thereby causing disruption into bubbles and the disturbance contact between the disrupted minute bubbles in the layer, namely by making the contacting interface area very large, so that a method of the present invention can be realized the high rate of desulfurization.

One of the advantages of the present invention is that since the pump for forcibly feeding the absorbent liquid of the continuous gas phase type into the gas flow is unnecessary, cost of the power required for circulation of the absorbent liquid is largely reduced. Namely, there is a feature that the contact between the gas and liquid in the first zone is not performed on the surface of fine liquid droplets, but it is performed on the surface of the minute bubbles produced by the introduction of the previously dispersed gas into the liquid. In other words, in the prior art method, the gas-liquid contact is performed by the energy of liquid and on the contrary in the present invention it is performed by the energy of gas. In addition, the pump for transmitting the energy of liquid is required to have anti-corrosion property and abrasion resisting property because it must treat $SO_2$ and also allow of solids, but according to the present invention, there is a large advantage that the gas blower used in place of the pump may be made of a usual material.

The feature of the present invention that the gas-liquid contact is performed under the continuous liquid phase is a large advantage with respect to the prevention of adhesion of solids. Namely, if once the solids adhere to the wall of pipe, it is difficult to peel off these by the flow of gas, but in the method of the present invention there is such a condition that the wall of pipe is always washed by the liquid, so that clogging of solids scarcely occurs.

Next, in the method of the present invention, the second zone which contacts with the first zone containing bubbles of the flue gas is also the continuous liquid phase containing bubbles of air, so that it is not required to connect respective zones of the first and second zones by means of pump and pipings etc., and the first zone and the second zone can be arranged generally up and down, and as the case may be, left and right, without any special boundary therebetween, and as a result there is an advantage that the apparatus can be made compactly and economically cheap.

Figure 3:
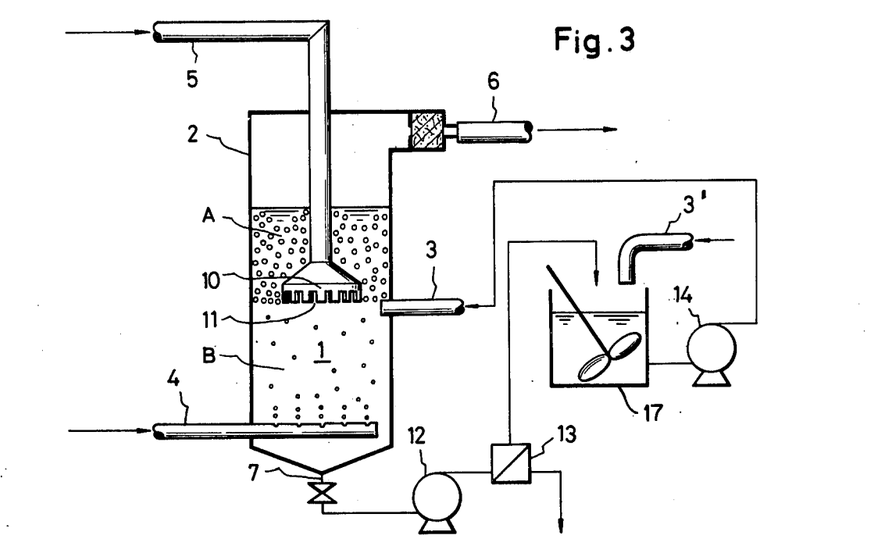
FIGS. 3, 4 and 5 illustrate further types of apparatus for carrying out the method according to the present invention.

Also, the first zone of the present invention contains bubbles of the flue gas and the second zone is a liquid phase containing bubbles of air, and the amount of air bubbles of the latter is below 10% of the amount of the flue gas bubbles contained in the former compared with the former, so that there is a difference in the amount of bubbles between the first and second zones and therefore there is a difference in the raising force of liquid due to the bubbles, and accordingly it is possible to perform mixing of the liquid without using an agitator as shown in FIGS. 3 and 4. Of course, there are the resultant grains of gypsum in the liquid so that in order to cause these to surely suspend in the liquid, a mechanical agitator may be used.

In the present invention, particularly the second zone is located immediately under the first zone, so that the speed of oxidation can be made larger than that of the prior art. Namely, it has been publicly known that the speed of absorbing oxygen in the air is approximately proportional to a partial pressure of $O_2$, and the air blown in the second zone under the condition of the continuous liquid phase exists also in the first zone as independent bubbles as well as in the second zone and always has a partial pressure of about 0.2 atm. which is the same of that of the air and absorbed into the liquid at a speed corresponding to said pressure thereby performing the oxidation. In the prior art method in which $O_2$ is directly blown in the flue gas, the air is mixed with the flue gas not in the condition of bubbles and as a result the partial pressure is below one-tenth of said value, and rises, at most, no more than 0.02 atm., and accordingly the speed of oxidation becomes slow, but in the present invention such a fact does not occur.

EXAMPLE 1

The type of the apparatus used was such one as shown in FIG. 1, in which a diameter of the tank 2 of circular cross-section was 800 mm and a depth of the liquid level was 1800 mm, and as an flue gas introducing pipe 5 four pipes of 3 inches in diameter were used, and a depth of the opening portion of each pipe was 200 mm from the liquid level. Within said tank 2 agitating impeller 8 and a cylindrical baffle 9 of 500 mm in diameter were provided.

Flue gas containing 1280 ppm of $SO_2$ and 3% of $O_2$ was blown in through an introducing pipe 5 at a rate of 980 Nm³/hr. and while agitating the liquid, air was blown in through an oxygen containing gas introducing pipe 4 mounted at 1400 mm below the liquid level at a rate of 10 Nm³/hr., and also $CaCO_3$ (4.5 kg/hr.) was supplied through a supply pipe 3 for the reactant as slurry so as to allow pH of the absorbent liquid to become 3.5.

The desulfurized gas ($SO_2$ 10-20 ppm) was discharged through a discharge pipe 6. An amount of the absorbent liquid taken out through an absorbent liquid discharge pipe 7 by means of a pump 12 for adjusting the height of liquid was 100 l/hr., and a concentration of gypsum was 10% by weight.

The result of analysis of the produced gypsum was as follows:

| | | |
|---|---|---|
| $CaSO_4 \cdot 2H_2O$ | 99.4% | by weight |
| $CaCO_3$ | 0 | " |
| $CaSO_3 \cdot \frac{1}{2}H_2O$ | 0 | " |
| pH | 6 | " |

As is apparent from the above, in the apparatus of the present invention, since not only the absorption and oxidation of $SO_2$ are performed simultaneously, but also these inclusive of concentrating of the by-products, sulfate can be performed by means of a single apparatus, the process can be carried out without consideration of clogging of machine parts even in the case where dusts are contained in the flue gas and/or in the case where as the absorbent liquid, liquid having a reactant suspended therein is used, and accordingly there are effects such that allowable range of apparatus is wide and small-sized construction of apparatus can be attained.

EXAMPLE 2

Using an apparatus of the type shown in FIG. 3, 980 $Nm^3/H$ of a flue gas having a concentration of sulfur dioxide of 1120 ppm, an oxygen content of 3% and a temperature of about 200° C., discharged from a boiler using heavy oil as fuel was cooled to about 60° C. by means of a spray and then introduced into a tank 2 containing the absorbent liquid and having 6000 mm in height and 600 mm in diameter. In this case, the depth of the first zone A was 1000 mm and the depth of the second zone B was 3500 mm. Air for oxidation was introduced through a duct 4 at a rate of 10 $Nm^3/H$, and lime stone powder (4.7 kg/H) of 95% pass of 325 meshes was introduced so as to maintain a concentration of sulfuric acid of 0.02–0.3% by weight. The rate of desulfurization at this time was 90–99%.

The amount of absorbent liquid fed to the centrifugal separator by means of the pump 12 was 100 l/H, and the concentration of gypsum in the tank 2 was held at 8% by weight. This mother liquor and supply water of about 70 l/H were introduced in a spray thereby cooling the flue gas.

The result of analysis of the produced gypsum was as follows:

| | | | |
|---|---|---|---|
| $CaSO_4 . 2H_2O$ | 98.9% by weight | pH | 6 |
| $CaCO_3$ | 0% by weight | Average grain Diameter | 60μ |
| $CaSO_3$ | 0% by weight | Setting Time, Initial | 8 min. and 30 sec. |
| Attached Water | 9% by weight | Setting Time, Final | 22 min. and 40 sec. |
| | | Wet Tensile Strength | 10.7 kg/cm² |

Also, the rate of utilization of lime stone was 100%, and the result of continuous operation for one month was that there was no symptom of the scaling at all.

EXAMPLE 3

Using an apparatus shown in FIG. 3, a gas comprising 950 $Nm^3/H$ of a flue gas discharged from a boiler using heavy oil as fuel and having a sulfur dioxide concentration of 1050 ppm, an oxygen concentration of 4% and a temperature of about 200° C. and 0.2 $Nm^3/H$ of $NH_3$ added thereto (addition for lowering the dew point of $SO_3$1) was introduced through a duct d5 into the tank 2 holding the absorbent liquid having 500 ppm of ferric ion dissolved therein. 10$Nm^3/H$ of air for oxidation was introduced through a duct 4, and lime stone powder (3.8 kg/H) of 951 % pass of 325 meshes was supplied so as to maintain a concentration of sulfuric acid of 0.03–0.06% by weight. The rate of desulfurization at this time was 94–97%. Also, $NH_3$ in theoutlet flue gas was zero. When the absorbent liquid was analyzed after the operation for five days, a concentration of ammonium sulfate was 9% by weight (produced amount of 70 kg), and it was confirmed that the added $NH_3$ was absorbed and thereafter was oxidized by the air blown in. After the sixth day, in order to restrain increase of the concentration of ammonium sulfate, the mother liquor after the centrifugal separation was intermittently discharged at a rate of 150l per day. Amount of gypsum centrifugally separated was 8 kg/H, and according to the result of analysis, $CaCO_3$ and $CaSO_3$ in the gypsum was zero.

EXAMPLE 4

Using an apparatus shown in FIG. 3, 550 $Nm^3/H$ of a flue gas discharged from a boiler using heavy oil as fuel and having a sulfur dioxide concentration of 1070 ppm, an oxygen concentration of 3% and a temperature of about 200° C. was added with 5 $Nm^3H$ of sulfur dioxide from a bomb thereby making the sulfur dioxide concentration about 1000 ppm, and the resulting gas was introduced into the tank 2 containing the absorbent liquid. 50 $Nm^3/H$ of air for oxidation was introduced through the duct 4, and lime stone powder (23 kg/H) of 95% pass of 32.5 meshes was supplied so as to maintain a concentration of sulfuric acid of 0.03–0.06% by weight. The rate of desulfurization at this time was 90–93%.

EXAMPLE 5

Using an apparatus shown in FIG. 3, 1250 $Nm^3/H$ of a flue gas discharged from a boiler used heavy oil as fuel and having a sulfur dioxide concentration of 390 ppm, an oxygen concentration of 3% and a temperature of about 200° C. was introduced into the tank 2 containing the absorbent liquid having 200 ppm of ferric ion dissolved therein. 10 $Nm^3/H$ of air for oxidation was introduced through the duct 4, and lime stone powder (2 kg/H) of 95% pass of 325 meshes was supplied so as to maintain a concentration of sulfuric acid of 0.02–0.04% by weight. The rate of desulfurization at this time was 97–99%.

EXAMPLE 6

1080 $Nm^3/H$ of a boiler flue gas including 1540 ppm of sulfur dioxide was introduced through the opening portion 10 of an introducing pipe 5 into the tank 2 (all amount of liquid 0.86 m³ including $Fe^{+++}$480 ppm) having the inclined bottom face and a baffle 9 as shown in FIG. 4. The flue gas was divided by means of a plurality of slots and formed groups of bubbles of a height of about 600 mm which were flowed violently in the tank. Air was fed in from the right side of the baffle 9 at a rate of 20 $Nm^3/H$ through the duct 4, it was observed that rising of the air bubbles was gentler than that of the bubbles on the flue gas and the flowing was revolving around the baffle 9 as shown by the arrow in FIG. 4. After the sulfuric acid concentration had reached 0.1% by weight (the limit was obtained by examination of the determination of conductivity and pH and the value of chemical analysis), pulverized lime stone powder of 90% pass of 200 meshes was added throughthe duct 3 so as to maintain a concentration of sulfuric acid of 0.02–0.03% by weight. Next, the slurry of the produced gypsum was taken out at a rate of 0.1 m³/H by means of a pump 12 through a liquid discharge pipe 7. A concentration of the slurry of gypsum was thus maintained within 10–12% by weight. The cleaned gas was discharged through a gas discharge pipe 6 and according to the measurement by use of an infrared type $SO_2$ densitometer mounted in the gas discharge pipe 6, a concentration of the discharged $SO_2$ showed 20–160 ppm by volumetric standard.

EXAMPLE 7

Using the same apparatus as that used in Example 6, 960 $Nm^3/H$ of waste gas of a incinerator (assistant burning-up of waste materials of vinyl chloride by heavy oil) including 1030 ppm of sulfur dioxide and 540 ppm of hydrochloric acid was introduced into the tank 2 through the duct 5. Liquid in the tank was at first water, but $SO_2$ absorbed by air blown in through the duct 4 was oxidized thereby producing sulfuric acid, and it concentration rose to 0.3% by weight. On the other hand, the lime stone powder of the same grain size as that in Example 6 was introduced through the duct 3 to adjust rising of the sulfuric acid concentration. Hydrochloric acid in the waste gas was simultaneously absorbed, but was neutralized by the lime stone powder and thereby fixed as calcium chloride. The slurry of gypsum was taken out at a rate of 0.1 m$^3$/H by means of the pump 12 through the duct 7 and subjected to separation treatment by means of a centrifugal separater (not shown), with the result that 8 kg/H of gypsum (containing attached water) was obtained. Since the mother liquor included calcium chloride due to HCl from the waste gas, it was drawn out intermittently at a rate of 6.5 kg once a day, and thereby the composition of the absorbent liquid was 7-8% by weight of gypsum, 9-10% by weight of calcium chloride and 0.1-0.3% by weight of sulfuric acid, and thus stable operation was permitted. Sulfur dioxide in the gas discharged from the duct 6 showed 20-35 ppm during the operation, and on the other hand, hydrochloric acid was between trace and 1 ppm.

EXAMPLE 8

In an apparatus shown in FIG. 5 in which four funnels was arranged in the lateral direction at a square pitch, each of said funnel having an upper diameter of 200mm, an angle of cone portion of 60°, a lower leg diameter of 80 mm and a length of 500 mm and having six slits at the forward end of the lower leg, each of said slits being of 20 mm in breadth and 100 mm in length, and said forward end of said leg portion is located at 250 mm below the liquid level in the cup of a diameter of 500 mm and a length of 800 mm, a slurry of pH 3-4 containing 5 wt% of gypsum slurry at 55° C. was caused to be circulated from said cup at a liquid-gas ratio 0.5 l/Nm$^3$ by means of a pump while a flue gas of 60° C. and of a composition of $SO_2$ 1000 ppm and oxygen 3% was supplied at a rate of 1000 Nm$^3$/H, with the result that a concentration of $SO_2$ in the outlet gas was 50 ppm and a desulfurization rate of 95% was obtained, and at this time a loss of gas pressure was 200 mm by water column.

For comparision, using the same composition of liquid, a flue gas of the same compositiond was determined with respect to its outlet gas composition by means of a Venturi scrubber of a length of 1500 mm and a throat diameter of 150 mm, with the result that it was 700 ppm at a liquid-gas ratio of 14 l/Nm$^3$. At this time, a loss of gas pressure was 70 mm by water column.

It was further tried to raise the desulfurization rate further more by connecting three of said Venturi scrubbers in series, and the result was that at a liquid-gas ratio of 14 l/Nm$^3$ to each scrubber, $SO_2$ in the outlet gas was 80 ppm. At this time, a whole pressure loss of gas was 210 mm by water column.

As described above, it was shown that in such as compact apparatus utilizing space effectively as the present invention,d a higher performance of desulfurization can be obtained.

EXAMPLE 9

Figure 6:
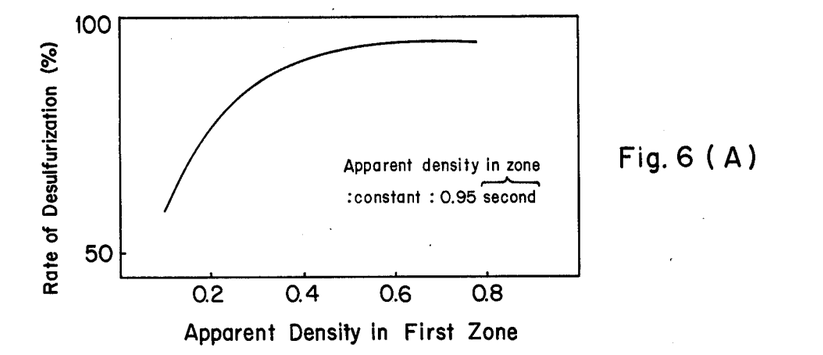

Using an apparatus of the type shown in FIG. 3, a flue gas of boiler having a concentration of sulfur dioxide of 1120 ppm was introduced into the tank 2. In this case, a depth of th first zone A was 1000 mm and that of the second zone B was 3500 mm. A relation between apparent density and rate of desulfurization in this case was as shown in FIGS. 6 (A), (B) and (C).

What is claimed is:

1. A method of removing sulfur dioxide from flue gas by absorption in an aqueous absorbent, which comprises providing an enclosed body of an aqueous liquid absorbent for sulfur dioxide, sparging said flue gas into an upper portion of said body of liquid absorbent to form a first zone of said liquid absorbent, introducing an oxygen-containing gas into a lower portion of said body to form a second zone of said liquid absorbent, said second zone being below said first zone and having an apparent density higher than that of said first zone, circulating the resulting oxygen-containing absorbent from said second zone to said first zone near the point of flue gas introduction and introducing into said body of aqueous liquid absorbent an alkaline material reactive with the sulfur dioxide thereby fixing the sulfur dioxide in said liquid absorbent in the form of a sulfate and removing the fixed sulfate therefrom.

2. A method as claimed in claim 1, wherein an apparent density of the aqueous absorbent in the first zone is 0.2-0.7, and that in the second zone is 0.9-1.0.

3. A method as claimed in claim 1, wherein the reactant is a compound selected from the group consisting of ammonia, alkali metal compounds and alkaline earth metal compounds.

4. A method as claimed in claim 1, wherein the pollutants is $SO_2$, the reactant is $CaCO_3$ and the aqueous absorbent contains 0.01-1.0% by weight of sulfuric acid and 3-40% by weight of gypsum.

5. A method as claimed in claim 1, wherein the aqueous absorbent is an aqueous solution of sulfuric acid having a concentration of less than 1% by weight.

6. A method as claimed in claim 1, wherein the alkaline material is selected from the group consisting of $CaCO_3$, $Ca(OH)_2$, NaOH, $NH_3$, $NH_4OH$, $Mg(OH)_2$ and $Na_2SO_3$.

7. A method as claimed in claim 1, wherein the fixed sulfate is a solid matter and the liquid absorbent is a slurry containing said solid matter.

8. A method as claimed in claim 1, wherein the alkaline material is calcium carbonate and wherein the aqueous absorbent contains 3 to 40% by weight of gypsum.

* * * * *